(12) United States Patent
Van Nguyen

(10) Patent No.: US 6,401,108 B1
(45) Date of Patent: Jun. 4, 2002

(54) FLOATING POINT COMPARE APPARATUS AND METHODS THEREFOR

(75) Inventor: Huy Van Nguyen, Round Rock, TX (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/282,612

(22) Filed: Mar. 31, 1999

(51) Int. Cl.[7] ................................................ G06F 7/02
(52) U.S. Cl. ........................ 708/671; 708/201; 712/223
(58) Field of Search ............................... 708/671, 201; 712/221, 222, 223

(56) References Cited

U.S. PATENT DOCUMENTS

| | | | | |
|---|---|---|---|---|
| 5,835,389 A | * | 11/1998 | Wong | 708/671 |
| 5,889,983 A | * | 3/1999 | Mittal et al. | 708/223 |
| 5,957,996 A | * | 9/1999 | Shiraishi | 708/671 |
| 6,237,085 B1 | * | 5/2001 | Burns et al. | 708/223 |

* cited by examiner

*Primary Examiner*—David H. Malzahn
(74) *Attorney, Agent, or Firm*—Barry S. Newberger; Winstead Sechrest & Minick P.C.; Robert Carwell

(57) ABSTRACT

Floating-point compare apparatus and methods are implemented. An adder generates a difference in moduli of first and second input operands. A sign bit of the second input operand provides a carry-in bit to an adder. In a first embodiment, the first and second input operands correspond to first and second source operands of the executing floating-point compare instruction. Comparison logic generates the compare result in response to a sign bit of the difference, sign bits of the first and second input operands, and a signal that is asserted if the operands are equal, and if the floating-point compare instruction being executed is $A \geq B$, and negated otherwise. In a second embodiment, the first and second input operands are derived from the first and second source operands via switching logic that interchanges the operands in response to predecoded instruction information. The operands are interchanged, whereby the first and second input operands correspond, respectively, to the second and first source operands if the floating-point compare instruction being executed is $A \geq B$.

30 Claims, 4 Drawing Sheets

FLOATING POINT COMPARE APPARATUS AND METHODS THEREFOR

TECHNICAL FIELD

The present invention relates in general to data processing systems, and in particular, to apparatus and methods for performing floating-point compare operations in data processing systems.

BACKGROUND INFORMATION

Floating-point compare operations in data processing systems require that the system have the capability to compare two floating-point numbers in which the sign of the operands may either be the same, or may be different. Comparison of two floating-point operands with different signs can easily be done by observing the signs of the operands. However, comparison of two floating-point operands with the same sign is performed by subtracting the absolute value, or modulus, of a first operand from the absolute value of the second operand and then ascertaining the sign of the result to determine the outcome of the comparison.

This subtraction of the magnitudes of the operands is implemented using an adder with an appropriate carry-in. The required carry-in is a function both of the instruction, that is the particular type of comparison being executed, and the operands.

Modern high performance data processing systems employ data-forwarding design techniques in which operands arrive late in an instruction cycle. For example, an instruction that is ready to be issued to an execution unit may depend on a currently executing instruction for one or more of its operands. By snooping the output bus of the execution unit, the instruction waiting to be issued may issue, and then retrieve its operands from the output bus of the execution unit before the operands have been committed to their architected registers. However, in such data-forwarding designs, this creates a critical timing path for the compare operations, because of the added logic levels necessary to generate the carry-in from the operands. Thus, there is a need in the art for mechanisms to provide the required carry-in necessary to perform the floating-point compares, without adding logic levels to the timing path.

SUMMARY OF THE INVENTION

The aforementioned needs are addressed by the present invention. Accordingly there is provided, in a first form, a floating-point compare apparatus. In a first embodiment, the apparatus includes adder circuitry operable for receiving first and second source operands, the adder circuitry operable for outputting a difference of a modulus of the first operand and the second operand in response to instruction information and a carry-in bit, wherein the carry-in bit is a sign bit of the second operand. In a second embodiment, the apparatus contains adder circuitry operable for outputting a difference of a modulus of a first input operand and a second input operand in response to an executing instruction and a carry-in bit, wherein the carry-in bit is a sign bit of the second input operand. Also, included is a switch logic operable for outputting the first and second input operands in response to first and second source operands and a first instruction information signal. The switch logic is operable for switching between first and second states for outputting the signals in response to the instruction information signal.

There is also provided, in a second form, a method of method of performing floating-point compares. In a first embodiment, the method includes the step of generating a difference of moduli of first and second source operands in response to a carry-in bit and an instruction information signal, wherein the carry-in bit comprises a sign bit of the second instruction operand. In a second embodiment, the method generates a difference of moduli of first and second input operands in response to a carry-in bit and an executing instruction, wherein the carry-in bit comprises a sign bit of the second input operand. The method also contains the step of switching first and second source operands to output the first and second input operands in response to first and second source operands, wherein the switching step is in response to a first instruction information signal.

Additionally, there is provided, in a third form, a data processing system. In a first embodiment, the data processing system has a central processing unit (CPU) and a memory operable for communicating instructions and operand data to the CPU. The CPU includes instruction decode logic operable for receiving the instructions, and generating an instruction information signal in response thereto, and adder circuitry operable for receiving first and second source operands corresponding to a received instruction, the adder circuitry operable for outputting a difference of a modulus of the first operand and the second operand in response to the instruction information, and a carry-in bit, wherein the carry-in bit is a sign bit of the second operand. In a second embodiment, the data processing system contains a central processing unit (CPU) and a memory operable for communicating instructions and operand data to the CPU, in which the CPU has instruction decode logic operable for receiving the instructions, and generating an instruction information signal in response thereto, switch logic operable for receiving first and second source operands; and adder circuitry operable for receiving first and second input operands from the switch logic. The adder circuitry is operable for outputting a difference of a modulus of the first operand and the second operand in response to an executing instruction and a carry-in bit, wherein the carry-in bit is a sign bit of the second input operand, and wherein the switch logic switches between a first state for outputting the first and second input signals and a second state for outputting the first and second input signals in response to the first instruction information signal.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
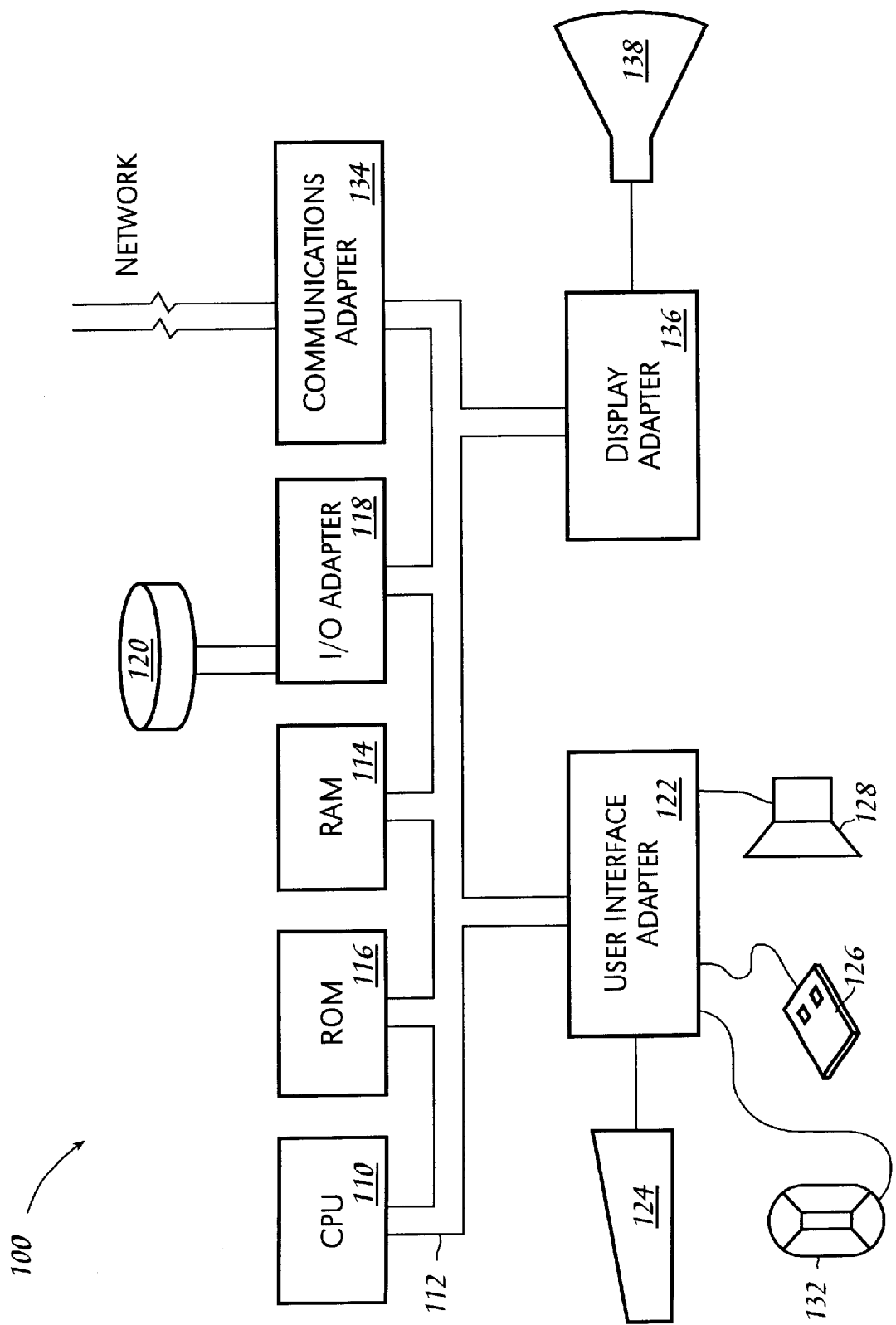
FIG. 1 illustrates, in block diagram form, a data processing system in accordance with an embodiment of the present invention.

A floating-point compare mechanism is provided. Operands to be compared are provided to an adder for subtraction of moduli of first and second input operands. A required carry-in bit is provided by a sign bit of the second input operand. The output of the adder is provided to comparison logic for determination of the sign of the result. In an embodiment of the present invention, the first and second input operands correspond to first and second compare source operands. These operands are additionally provided to comparator circuitry that determines if the operands are equal. The output of the comparator is also provided to the comparison logic. In another embodiment, the first and second source operands are provided to switch logic. Under the control of a predecoded compare instruction being executed, the switch logic may interchange the source operands to provide the first and second input operands to the adder. The adder subtracts the moduli of the first and second input operands with the required carry-in bit being provided by the sign bit of the second input operand. The output of the adder is provided to comparison logic for determination of the sign of the result and generation of a compare result therefrom.

In the following description, numerous specific details are set forth, such as specific order byte lengths, etc. to provide a thorough understanding of the present invention. However, it will be obvious to those skilled in the art that the present invention may be practiced without such specific details. In other instances, well-known circuits have been shown in block diagram form, in order not to obscure the present invention in unnecessary detail. For the most part, details concerning timing considerations and the like have been omitted as such details are not necessary to obtain a complete understanding of the present invention other than within the skills of persons of ordinary skill in the relevant art. In the following description of the implementation of the present invention, the terms "assert" and "negate" and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Refer now to the drawings, wherein depicted elements are not necessarily shown to scale and wherein like or similar elements are designated by the same reference numeral through the several views.

A representative hardware environment for practicing the present invention is depicted in FIG. 1, which illustrates a typical hardware configuration of data processing system 100 in accordance with the subject invention having central processing unit (CPU) 110, such as a conventional microprocessor, and a number of other units interconnected via system bus 112. Data processing system 100 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting data processing system 100 to a data processing network, and display adapter 136 for connecting bus 112 to display device 138. CPU 110 may include other circuitry not shown herein, which will include circuitry commonly found within a microprocessor, e.g., execution unit, bus interface unit, arithmetic logic unit, etc. CPU 110 may also reside on a single integrated circuit.

Figure 2:
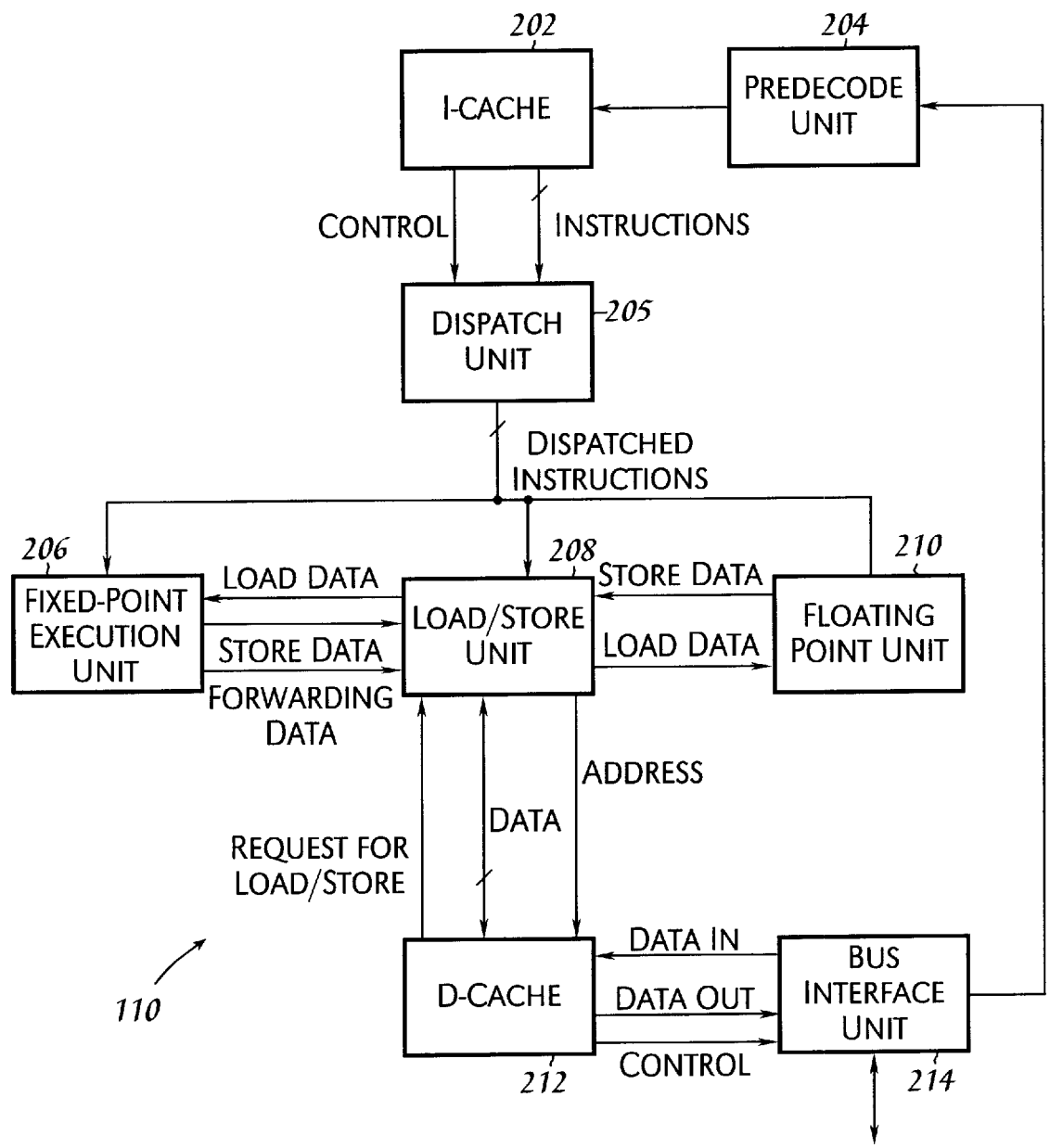
FIG. 2 illustrates, in block diagram form, a central processing unit in accordance with an embodiment of the present invention.

FIG. 2 illustrates a portion of CPU 110 in greater detail. The portion of CPU 110 includes an instruction cache (I-cache) 202, a predecode unit 204, a dispatch unit 205, a fixed point execution unit (FXU) 206, a load/store unit 208, a floating point unit (FPU) 210, a data cache (D-cache) 212, and a bus interface unit (BIU) 214.

I-cache 202 is coupled to predecode unit 204 to communicate control information and a plurality of predecoded instructions. Dispatch unit 205 is coupled to each of FXU 206, load/store unit 208, and FPU 210 to provide a plurality of dispatched instructions. I-cache 202 is coupled to bus interface unit 214 to communicate Data and Control information. FXU 206 is coupled to load/store unit 208 to communicate a load data value, a store data value, and a forwarding data value. Load/store unit 208 is coupled to FPU 210 to communicate a store data value and load data value. Load/store unit 208 is also coupled to D-cache 212 to communicate a request for a load/store signal, a plurality of data values, and an address value. D-cache 212 is coupled to bus interface unit 214 to communicate a data in signal, a data out signal, and a control signal. The floating-point compare mechanism of the present invention may be included in FXU 206.

Figure 3:
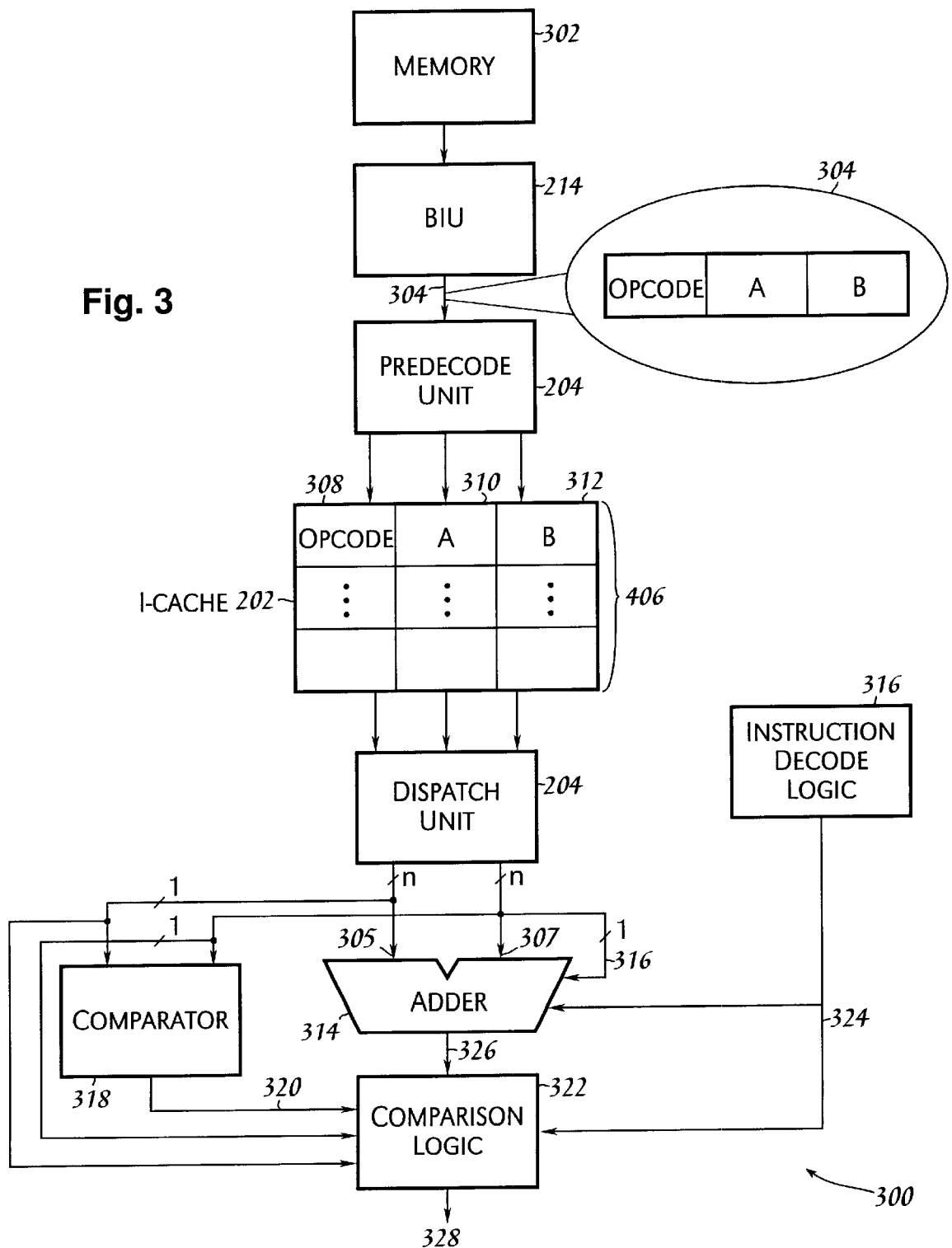
FIG. 3 illustrates, in block diagram form, a floating-point compare mechanism in accordance with an embodiment of the present invention.

Refer now to FIG. 3, illustrating floating-point compare mechanism 300 in accordance with an embodiment of the present invention. Instructions stored in memory 302 are communicated to predecode unit 204 via BIU 214 forming instruction signal 304. Instructions signals 304 include an opcode portion, and two input operand portions containing data representing source operand A and source operand B. The opcode portion informs CPU 110 as to the instruction to be performed. Predecode unit 204 partially decodes instruction signal 304, and outputs the partially decoded instruction to I-cache 202.

Each entry 306 in cache 202 includes an instruction portion 308 and input operand portions 310 and 312, respectively Predecode unit 204 loads the predecoded instruction into portion 308, and one of operands A, and B, into portions 310 and 312. Source operands, A and B, are provided to adder 314. Adder 314 also receives instruction information corresponding to the compare instruction to be executed from instruction decode logic 316. The information informs adder 314 that the operation to be performed on operands A and B is a subtraction of the respective moduli of the operands. Additionally, a carry-in bit must be provided to adder 314.

The required carry-in bit may be determined by the operations to be performed by adder 314 on the input operands. There are four compare operations to be analyzed:

$A > B$, $A \geq B$, $A \leq B$, and $A \geq -B$.

The operations to be performed for each of these cases may be described by a set of equations from which the corresponding carry-in bit may be obtained. In the equations that follow, the quantities appearing therein are interpreted in accordance with their internal representation within CPU 110, and in particular, within FXU 206. In particular, the value "1" in the equations that follow refer to a value 1 in the least significant bit (LSB) of a floating-point quantity, and zeros and all other bits in the representation. For the floating-point compare $A > B$, the carry-in bit is determined as follows:

$$A \geq 0, B \geq 0 \quad (1a)$$

$$A > B \Leftrightarrow |A| - |B| > 0$$
$$\Rightarrow |A| - |B| - 1 \geq 0$$
$$\Rightarrow |A| + (|\overline{B}| + 1) - 1 \geq 0$$
$$\Rightarrow |A| + |\overline{B}| \geq 0$$
$$\Rightarrow \text{carry-in} = 0,$$
$$\text{sign} = 0$$
$$\Rightarrow A > B.$$

$$A < 0, B < 0 \quad (1b)$$
$$A > B \Leftrightarrow |A| - |B| < 0$$
$$\Rightarrow |A| + (|\overline{B}| + 1) < 0$$
$$\Rightarrow \text{carry-in} = 1,$$
$$\text{sign} = 1$$
$$\Rightarrow A > B.$$

In equations (1a) and (1b), the subtraction of the moduli of A and B is performed by adder 314 using two's-compliment arithmetic. The two's-compliment representation subtrahend (the modulus of B) is represented by $|\overline{B}|+1$. The carry-in bits for the other floating-point compare operations are determined sinilarly. For $A \geq B$:

$$A \geq 0, B \geq 0 A \geq B \Leftrightarrow |A|-|B| \geq 0 \Leftrightarrow |A|+(|\overline{B}|+1) \geq 0 \Leftrightarrow \text{carry-in}=1, \text{sign}=0 \Leftrightarrow A \geq B \quad (2a).$$

$$A<0, B<0 A \geq B \Leftrightarrow |A|-|B| \leq 0 \Leftrightarrow |A|-|B|-1<0 \Leftrightarrow |A|+(|\overline{B}|+1)-1<0 \Leftrightarrow |A|+|\overline{B}|<0 \Leftrightarrow \text{carry-in bit}=0, \text{sign}=1 \Leftrightarrow A \geq B \quad (2b).$$

For $A \leq B$, the carry-in bit is determined as follows:

$$A \geq 0, B \geq 0 A \leq B \Leftrightarrow |A|-|B| \leq 0 \Leftrightarrow |A|-|B|-1<0 \Leftrightarrow |A|+(|\overline{B}|+1)-1<0 \Leftrightarrow |A|+|\overline{B}|<0, \Leftrightarrow \text{carry-in}=0, \text{sign}=1 \Leftrightarrow A \leq B \quad (3a).$$

$$A<0, B<0 A \leq B \Leftrightarrow |A|-|B| \geq 0 \Leftrightarrow |A|+(|\overline{B}|+1) \geq 0 \Leftrightarrow \text{carry-in bit}=1, \text{sign}=0 \Leftrightarrow A \leq B \quad (3b).$$

For $A \geq -B$, the carry-in bit is determined by:

$$A \geq 0, B<0 A \geq -B \Leftrightarrow |A|-|B| \geq 0 \Leftrightarrow |A|+(|\overline{B}|+1) \geq 0 \Leftrightarrow \text{carry-in}=1, \text{sign}=0 \Leftrightarrow A \geq -B \quad (4a).$$

$$A<0, B \geq 0 A \geq -B \Leftrightarrow |A|-|B| \leq 0 \Leftrightarrow |A|-|B|-1<0 \Leftrightarrow |A|+(|\overline{B}|+1)-1<0 \Leftrightarrow |A|+|B|<0 \Leftrightarrow \text{carry-in bit}=0, \text{sign}=1 \Leftrightarrow A \geq -B \quad (4b).$$

For floating-point compares $A>B$, $A \geq B$, and $A \leq B$, only same-sign operands need be considered, because, as discussed above, these compare operations are immediately determined from the operand signs for opposite-sign operands. Conversely, for floating-point compare $A \geq B$, only opposite-sign operands are considered because the operand signs immediately determine the compare result for same-sign operands. For example, if A and B are both positive, A is always greater than −B, and vice versa if A and B are both negative. In the above equations, the sign bit of the result from adder 314 is also indicated. It is conventional that the sign bit of negative values is "1" and positive values have a sign bit of "0". These results are summarized in Table 1.

| Course Operation | Cases | Carry-In |
|---|---|---|
| A > B | A ≥ 0, B ≥ 0 | 0 |
|  | A < 0, B < 0 | 1 |
| A ≥ B | A ≥ 0, B ≥ 0 | 1 |
|  | A < 0, B < 0 | 0 |
| A ≤ B | A ≥ 0, B ≥ 0 | 0 |
|  | A < 0, B < 0 | 1 |
| A ≥ −B | A ≥ 0, B < 0 | 1 |
|  | A < 0, B ≥ 0 | 0 |

For the floating-point compare operations of $A>B$, $A \leq B$, and $A \geq -B$, the carry-in bit is the same as the sign bit of operand B. Thus, carry-in bit 316, in FIG. 3, is provided as the sign bit of operand B.

To resolve the exceptional case, floating-point compare operation $A \geq B$, comparator 318 is included. Comparator 318 determines if operands A and B are equal. If so, comparator 318 asserts signal 320 provided to comparison logic 322. Additionally, instruction information signal 324 informs adder 302 to perform the operations for a floating point compare operation of $A>B$, in accordance with equations (1a) and (1b). Additionally, instruction information signal 324 informs comparison logic 322 to logically OR result 326 from adder 314 with signal 320 to generate output 328 of floating-point compare mechanism 300. For floating-point compare operations, $A>B$ $A \leq B$, and $A \geq -B$, instruction information signal 324 informs comparison logic 322 to output result 326 of adder 314 as compare result 328.

Figure 4:
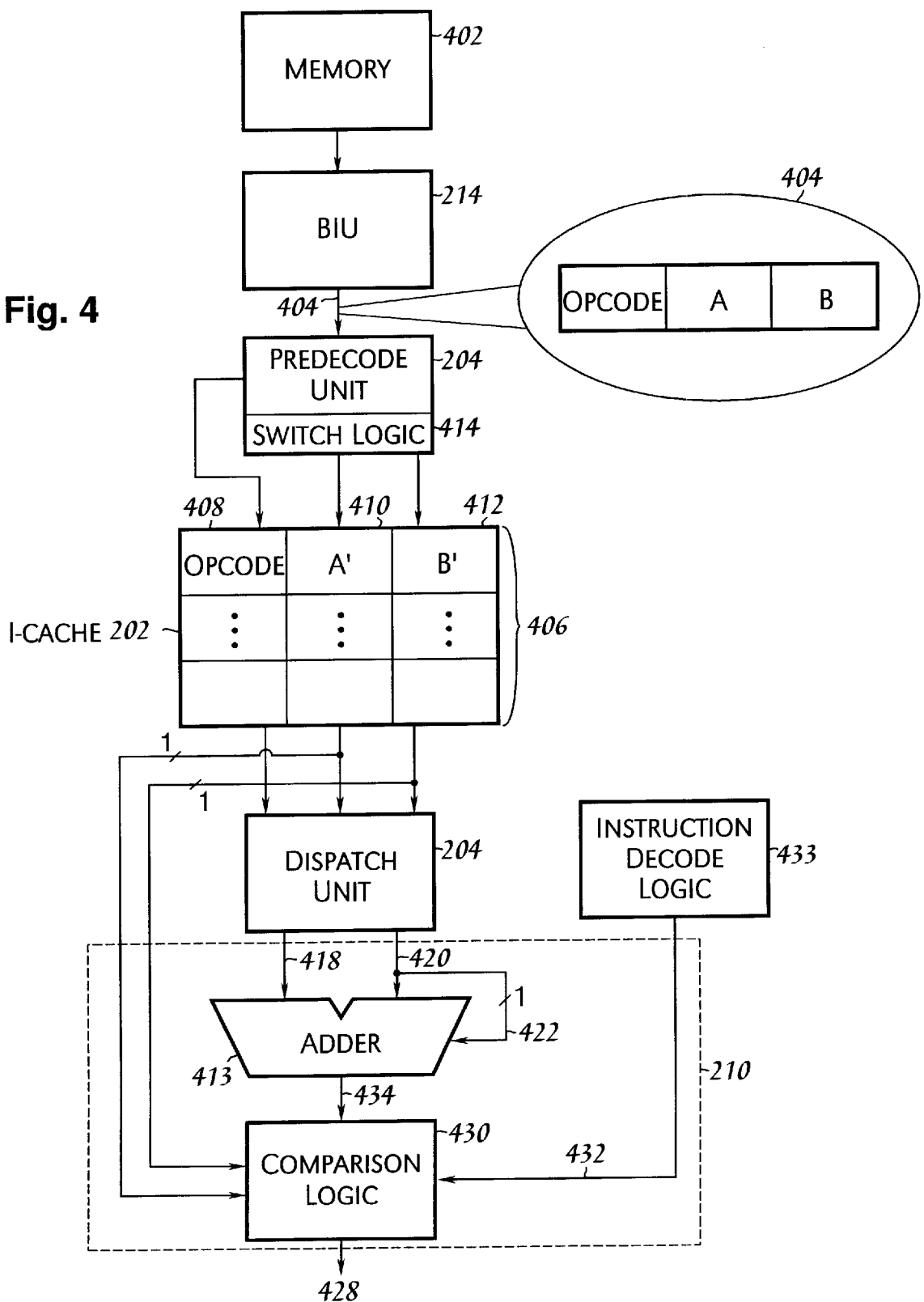
FIG. 4 illustrates, in block diagram form, a floating-point compare mechanism in accordance with another embodiment of the present invention.

Refer now to FIG. 4 illustrating portion 400 of CPU 110 in accordance with an alternative embodiment of the present invention. Instructions stored in memory 402 are communicated to predecode unit 204 via BIU 214 forming instruction signal 404. Instructions signals 404 include an opcode portion, and two input operand portions containing data representing source operand A and source operand B. The opcode portion informs CPU 110 as to the instruction to be performed. Predecode unit 204 partially decodes instruction signal 404, and outputs the partially decoded instruction to I-cache 202.

Each entry 406 in cache 202 includes an instruction portion 408 and input operand portions 410 and 412, respectively, corresponding to first and second input operands, A' and B'. Operands A' and B' form input operands of adder 413 as discussed below. Predecode unit 204 loads the predecoded instruction into portion 408, and one of operands A, and B, into portions 410 and 412. The input operands are loaded into portions 410 and 412 via switch logic 414 in predecode unit 204, in response to a predecoded instruction.

In the first state of switch logic 414, source operand A in signal 404 is loaded into portion 410, and source operand B is loaded into portion 412. Thus, in the first state of switch logic 414, operand A' is equal to operand A in signal 404. Likewise, operand B' is equal to operand B in instruction signal 404.

In a second state of switch logic 414, the operands are interchanged, wherein source operand A is loaded into portion 410 and source operand B is loaded into portion 412. Thus, in the second state of switch logic 414, operand A' is equal to source operand B in instruction signal 404. Similarly, operand B' is equal to source operand A in instruction signal 404.

Switch logic 414 is controlled by instruction information decoded from the opcode in instruction signal 404. In this way, switch logic 414 assumes one of the first and second states in accordance with instruction information obtained on predecode of instruction signal 404.

Instruction information and operands A' and B' are communicated to adder 413 via dispatch unit 204. Operand A' is provided to input 418 of adder 413 and operand B' is provided to input 420 of adder 413. Additionally, adder 413 receives a sign bit of operand B' as carry-in bit 422, in accordance with the discussion hereinabove.

For floating-point logic operations A>B, A$\leq$B, and A$\geq$−B, switch logic 414 is in the first state, in response to instruction information corresponding to predecoded instructions representing these operations. Thus, operand B' is equal to operand B, and the carry-in bit 422 is the sign bit of operand B, in accordance with the entries in Table 1.

For the floating-point compare operation A$\geq$B, switch logic 414 is in the second state. Switch logic 414 is placed in the second state in response to instruction information corresponding to the predecoded floating-point compare instruction corresponding to the aforesaid compare operation. Additionally, predecode unit 204 loads instruction information corresponding to the floating point operation A'<B' into portion 408, and adder 413 is thereby instructed to perform the floating-point operation A'$\leq$B', in accordance with equations (3a) and (3b) hereinabove. The required carry bit, as described hereinabove, is the sign bit of B', which, as shown in FIG. 4, is provided to carry-in 422. Because switch logic 402 is in the second state, when adder 413 performs the floating-point compare operation A'$\geq$B', the result is the same as if adder 416 had implemented the floating-point compare operation A$\geq$B, because operand B' is equal to operand A, and operand A' is equal to operand B.

Floating-point compare result 428 is output by comparison logic 430 in response to instruction information signal 432 received from instruction decode logic 433. Result 428 is determined by the sign bit of result 434, or its complement, depending on the signs of operands A and B, in accordance with equations (1a)–(4b).

A floating-point compare mechanism has been provided. The mechanism derives the required carry-in bit needed to perform the calculations that implement the floating-point compare instructions directly from the source operands, without adding additional logic levels to critical timing paths.

Although the present invention and its advantages have been described in detail, it should be understood that various changes, substitutions and alterations can be made herein without departing from the spirit and scope of the invention as defined by the appended claims.

What is claimed is:

1. A floating-point compare apparatus comprising:
adder circuitry operable for receiving first and second source operands, said adder circuitry operable for outputting a difference of a modulus of said first operand and said second operand in response to instruction information and a carry-in bit, wherein said carry-in bit is a sign bit of said second operand; and
comparator circuitry operable for receiving said first and second source operands, said comparator outputting a first signal having a first data value when said first and second operands are equal and a second data value when said first and second operands are unequal, said first signal being operable for logically combining with a second signal generated in response to a sign bit of said difference to form a compare result signal.

2. The apparatus of claim 1 further comprising comparison logic operable for receiving said difference and generating said second signal in response thereto and to said instruction information and a sign bit of said first and second operands, and wherein said comparison logic is operable for logically combining said first signal and said second signal to form said compare result.

3. The apparatus of claim 2 wherein said comparison logic forms a logical OR of said first signal and said second signal when said instruction information corresponds to a predetermined floating-point compare operation.

4. The apparatus of claim 3 wherein said predetermined floating point operation comprises A$\geq$B, wherein A represents said first operand and B represents said second operand.

5. The apparatus of claim 2 wherein said compare result comprises said second signal when said instruction information corresponds to one of a predetermined set of floating-point compare operations.

6. The apparatus of claim 5 wherein said predetermined set of floating-point compare operations comprises:
A>B;
A$\leq$B; and
A$\geq$−B, wherein A represents said first operand and B represents said second operand.

7. A floating-point compare apparatus comprising:
adder circuitry operable for outputting a difference of a modulus of first and second input operands in response to an executing instruction and a carry-bit, wherein said carry-bit is a sign bit of said second input operand; and
switch logic operable for outputting said first and second input operands in response to first and second source operands, and a first instruction information signal, said switch logic operable for switching between a first state for outputting said signals and a second state for outputting said signals in response to said first instruction information signal.

8. The apparatus of claim 7 wherein said first instruction information signal comprises a predecoded instruction information signal.

9. The apparatus of claim 7 further comprising comparison logic operable for receiving a difference signal from said adder, and generating a compare result in response thereto and to a second instruction information signal and a sign bit of said first and second operands.

10. The apparatus of claim 7 wherein said switch logic is in said first state when said first instruction information signal corresponds to a first predetermined floating-point compare operation, said first floating point-point compare operation being one of a predetermined set of floating-point compare operations, and is in said second state when said instruction information signal corresponds to a second predetermined floating point compare operation.

11. The apparatus of claim 10 wherein said predetermined set of floating-point compare operations comprises:
A>B;
A$\leq$B; and
A$\geq$−B, wherein A represents said first operand and B represents said second operand, and wherein said second predetermined floating-point compare operation comprises A$\geq$B.

12. The apparatus of claim 7 wherein said first and second input operands comprise said first and second source operands, respectively, when said switch logic is in said first state, and said first and second input operands comprise said second and first source operands, respectively, when said switch logic is in said second state.

13. A method of performing floating-point compares comprising the step of:

generating a difference of moduli of first and second source operands in response to a carry-in bit and an instruction information signal, wherein said carry-in bit comprises a sign bit of said second instruction operand;

determining if said first and second source operands are equal; and outputting a first signal, said first signal having a first data value when said operands are equal and a second data value when said operands are unequal, wherein said first signal is operable for combining with a second signal generated in response to a sign bit of said difference to form a compare result.

14. The method of claim 13 further comprising the steps of:

generating said second signal in response to said sign bit of said difference, said instruction information, and sign bits of said first and second source operands;

logically combining said first and second signals when said instruction information corresponds to a predetermined floating-point compare operation.

15. The method of claim 14 wherein said step of logically combining comprises the step of forming the logical OR of said first and second signals.

16. The method of claim 14 wherein said predetermined floating-point compare operation comprises $A \geq B$, wherein A represents said first operand and B represents said second operand.

17. A method of performing floating-point compares comprising the steps of:

generating a difference of moduli of first and second input operands in response to a carry-in bit and an executing instruction, wherein said carry-in bit comprises a sign bit of said second input operand;

switching first and second source operands to output said first and second input operands in response to first and second source operands, wherein said switching step is in response to a first instruction information signal.

18. The method of claim 17 wherein said switching step comprises the step of outputting said first and second source operands as said first and second source operands, respectively when said first instruction information signal corresponds to one of a predetermined set of floating-point compare operations.

19. The method of claim 18 wherein said predetermined set of floating-point compare operations comprises:

$A > B$;

$A \leq B$; and $A \geq -B$, wherein A represents said first operand and B represents said second operand.

20. The method of claim 17 wherein said switching step comprises the step of providing said first and second source operands as said second and first input operands, respectively when said instruction information signal corresponds to a predetermined floating-point compare operation.

21. The method of claim 20 wherein said predetermined floating point operation comprises $A \geq B$, wherein A represents said first operand and B represents said second operand.

22. The method of claim 17 wherein said first instruction information signal comprises a predecoded instruction information signal.

23. The method of claim 17 further comprising the steps of:

generating a compare result in response to a sign bit of said difference, a second instruction information signal, and first and second sign bits of said source operands.

24. A data processing system comprising:

a central processing unit (CPU);

a memory operable for communicating instructions and operand data to said CPU, said CPU comprising:

instruction decode logic operable for receiving said instructions, and generating an instruction information signal in response thereto;

adder circuitry operable for receiving first and second source operands corresponding to a received instruction, said adder circuitry operable for outputting a difference of a modulus of said first operand and said second operand in response to said instruction information and a carry-in bit, wherein said carry-in bit is a sign bit of said second operand;

comparator circuitry operable for receiving said first and second source operands, said comparator outputting a first signal having a first data value when said first and second operands are equal and a second data value when said first and second operands are unequal, said first signal being operable for logically combining with a second signal generated in response to a sign bit of said difference to form a compare result signal; and comparison logic operable for receiving said difference and generating said second signal in response thereto and to said instruction information and a sign bit of said first and second operands, and wherein said comparison logic is operable for logically combining said first signal and said second signal to form said compare result.

25. The data processing system of claim 24 wherein said comparison logic forms a logical OR of said first signal and said second signal when said instruction information corresponds to a predetermined floating-point compare operation.

26. The data processing system of claim 24 wherein said compare result comprises said second signal when said instruction information corresponds to one of a predetermined set of floating-point compare operations.

27. A data processing system comprising:

a central processing unit (CPU);

a memory operable for communicating instructions and operand data to said CPU, said CPU comprising:

instruction decode logic operable for receiving said instructions, said decode logic including predecode circuitry operable for predecoding said instructions and generating a first instruction information signal in response thereto;

switch logic operable for receiving first and second source operands; and adder circuitry operable for receiving first and second input operands from said switch logic, said adder circuitry operable for outputting a difference of a modulus of said first operand and said second operand in response to an executing instruction and a carry-in bit, wherein said carry-in bit is a sign bit of said second input operand, and wherein said switch logic switches between a first state for outputting said first and second input signals and a second state for outputting said first and second input signals in response to said first instruction information signal.

28. The data processing system of claim 27 wherein said CPU further comprises:

comparison logic operable for receiving a difference signal from said adder, and generating a compare result in response thereto and to a second instruction information signal, received from said decode logic, and a sign bit of said first and second operands.

29. The data processing system of claim 27 wherein said switch logic is in said first state when said first instruction information signal corresponds to a first predetermined floating-point compare operation, said first floating point-point compare operation being one of a predetermined set of floating-point compare operations, and is in said second state when said instruction information signal corresponds to a second predetermined floating point compare operation.

30. The data processing system of claim 27 wherein said first and second input operands comprise said first and second source operands, respectively, when said switch logic is in said first state, and said first and second input operands comprise said second and first source operands, respectively, when said switch logic is in said second state.

* * * * *